UNITED STATES PATENT OFFICE.

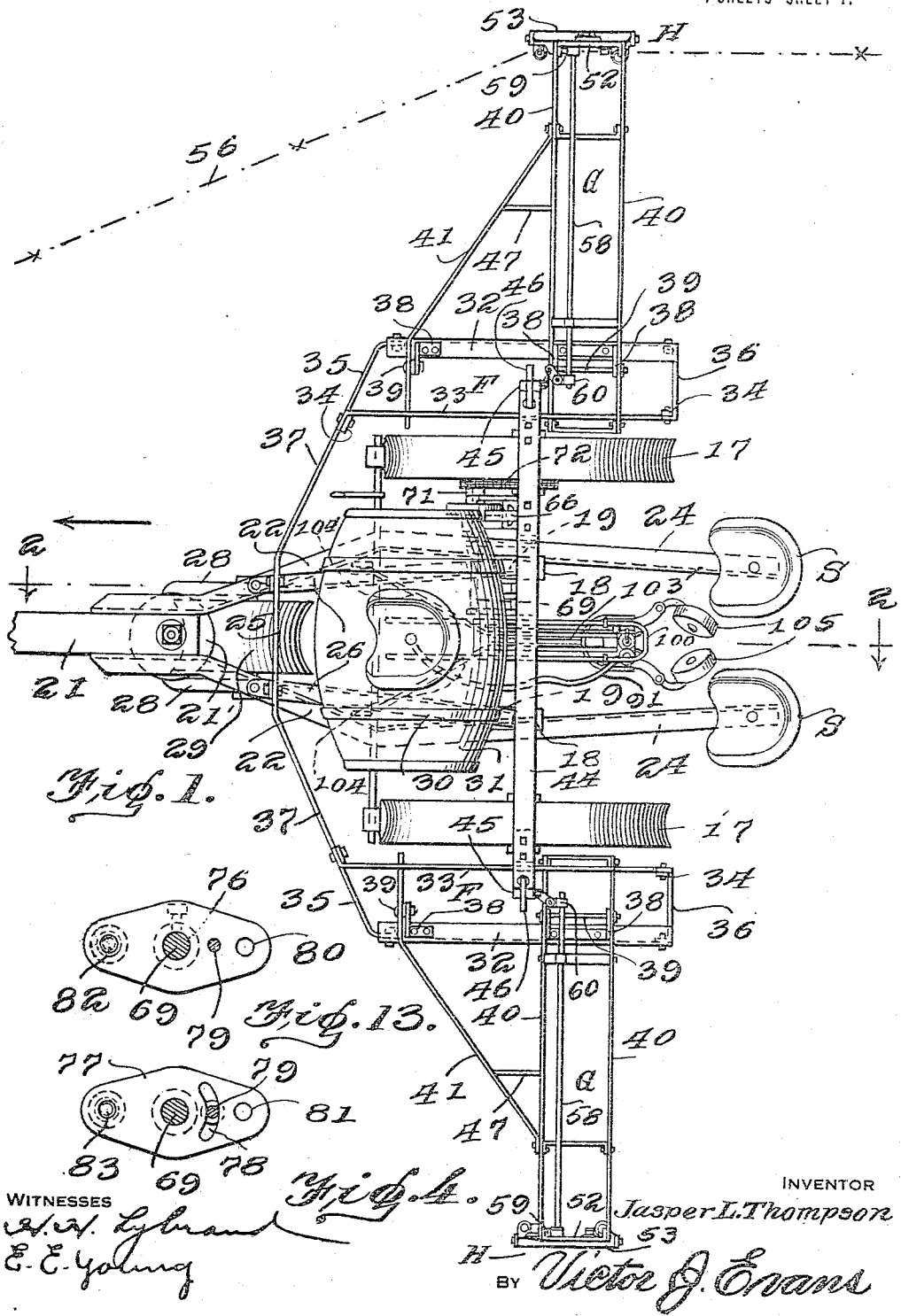

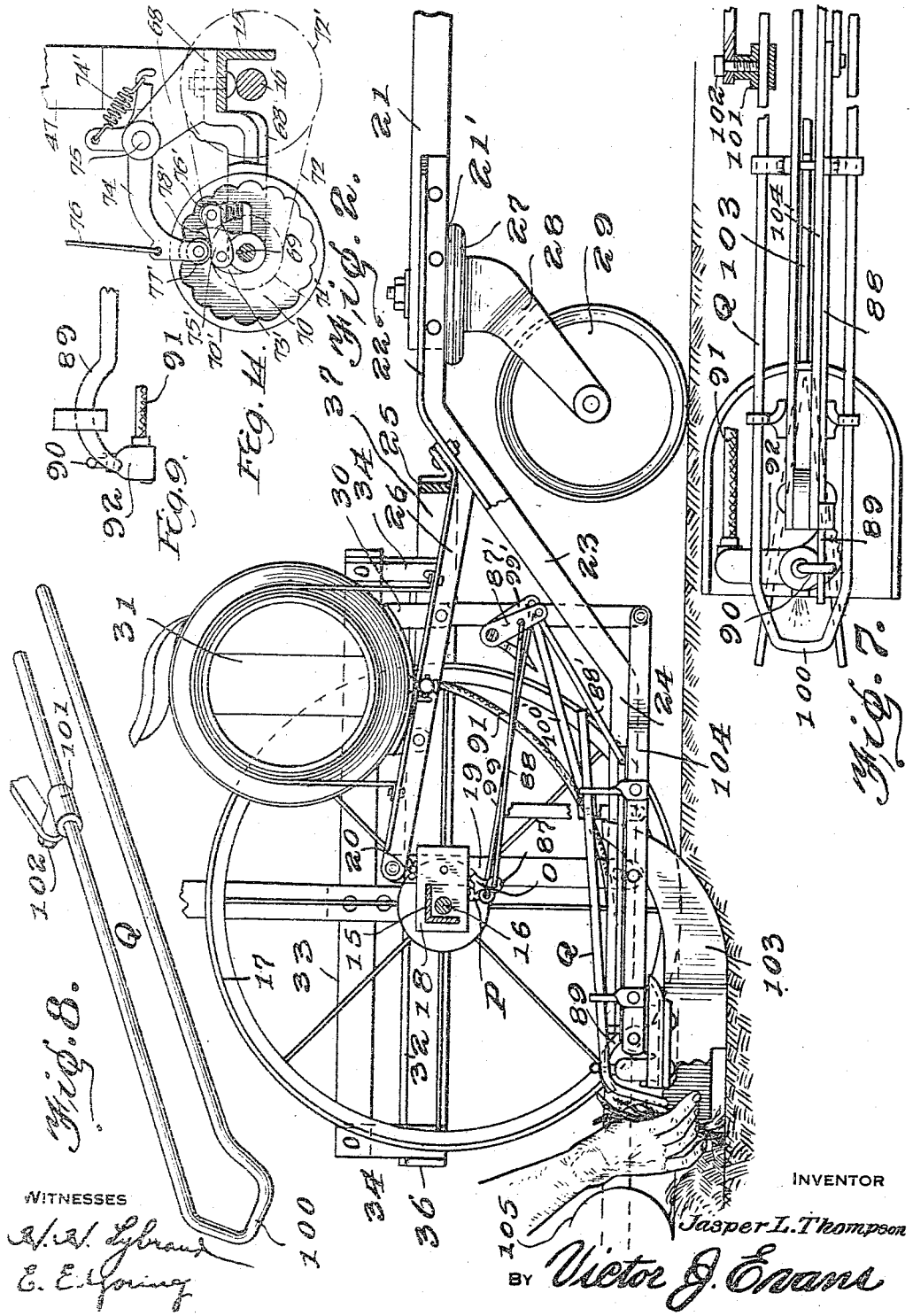

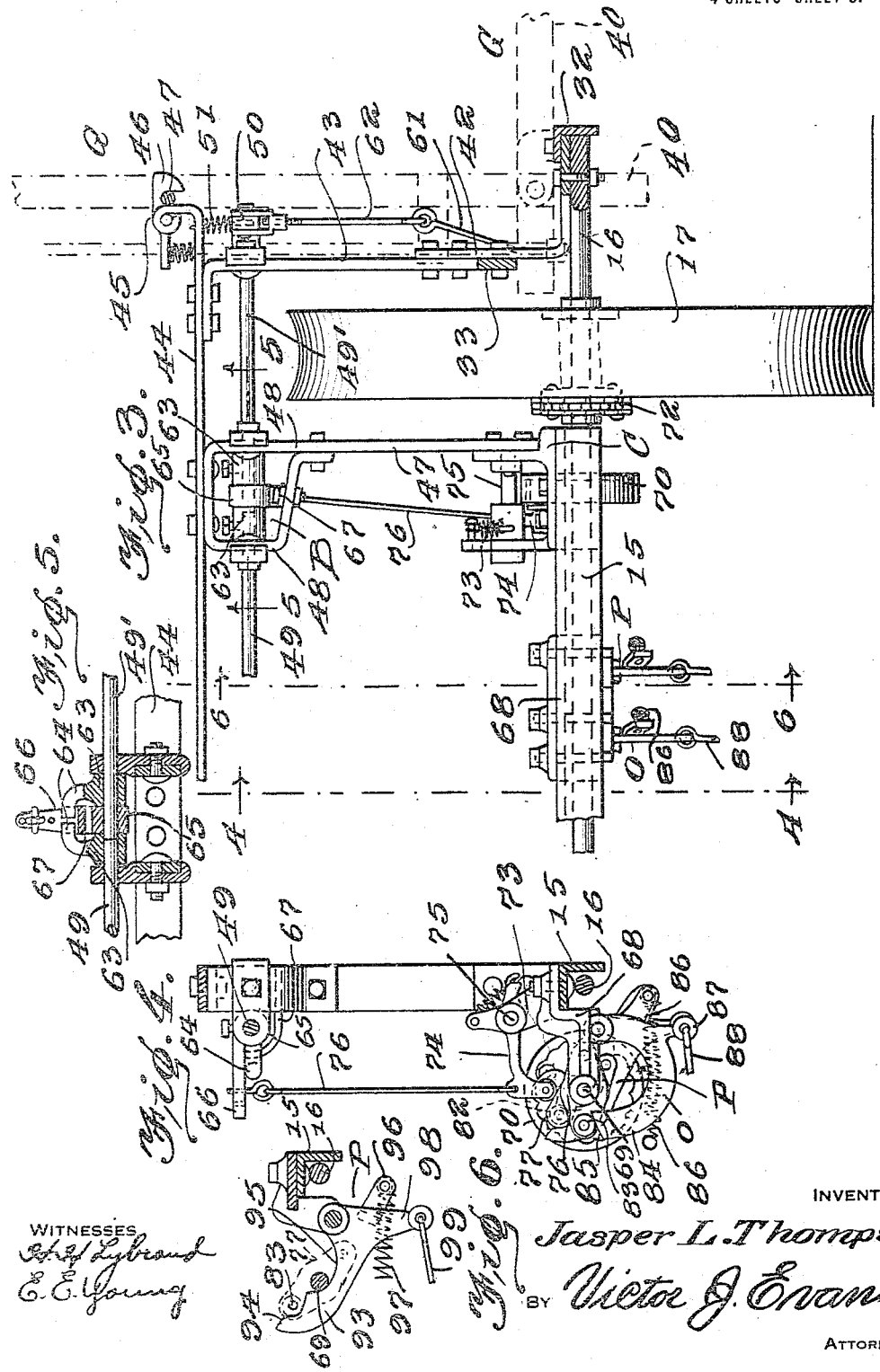

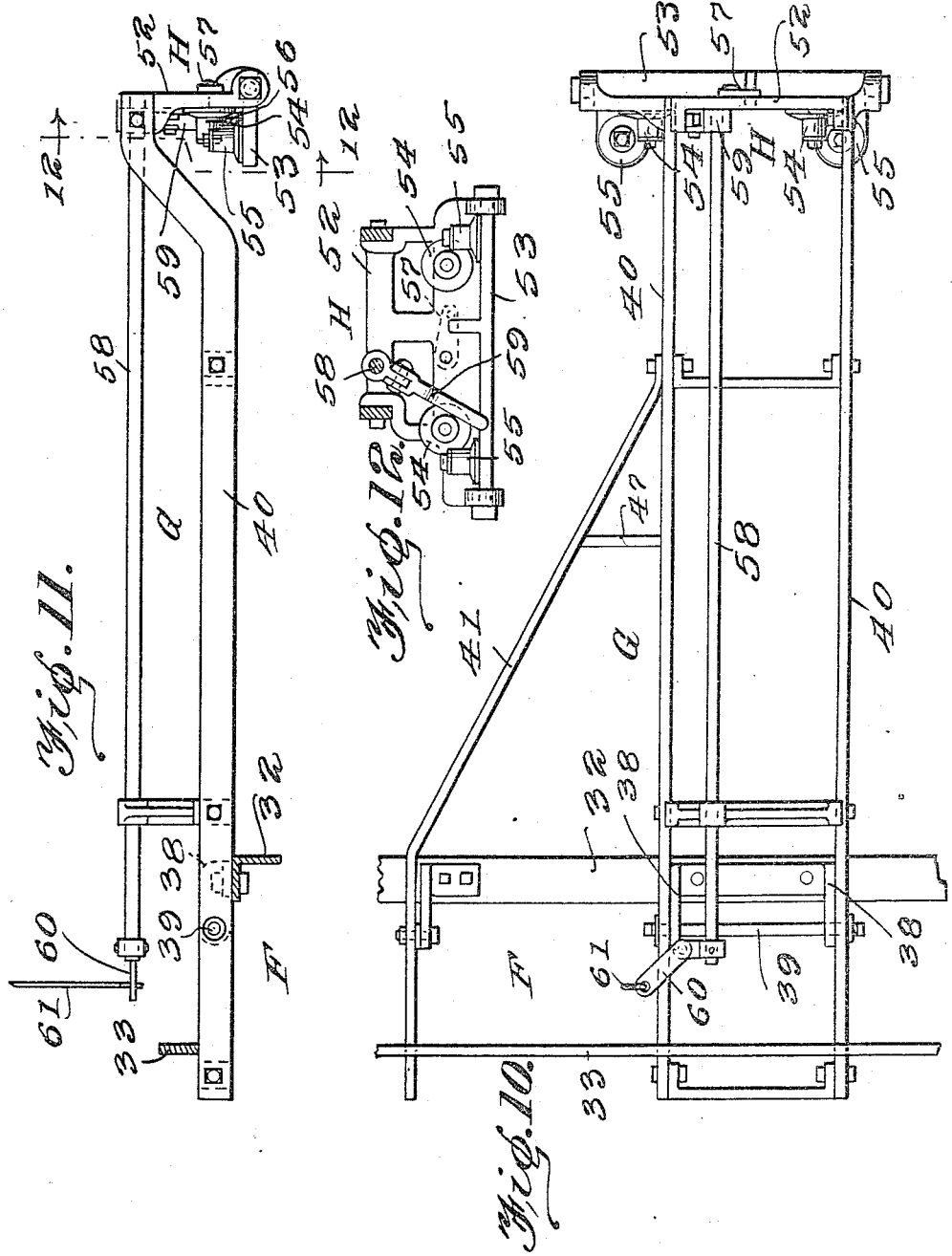

JASPER LEE THOMPSON, OF HURLOCK, MARYLAND.

CHECK-ROW TRANSPLANTER.

1,267,713.  Specification of Letters Patent.  Patented May 28, 1918.

Application filed April 14, 1917. Serial No. 162,058.

*To all whom it may concern:*

Be it known that I, JASPER L. THOMPSON, a citizen of the United States, residing at Hurlock, in the county of Dorchester and State of Maryland, have invented new and useful Improvements in Check-Row Transplanters, of which the following is a specification.

This invention relates to transplanting machines which are used for setting out or transplanting sweet potatoes, tobacco, cabbage, tomato and strawberry plants and other plants of a like nature that require transplanting. In machines of this class seats are usually provided for one or more operators who, as the machine progresses over the field, set out the plants in a furrow made by a furrow opener with which the machine is provided, the dirt being pressed toward the roots of the plant by means provided for the purpose. Machines of this class have been provided with means for supplying water to each plant setting thus enabling the transplanting to be done in dry seasons. Means has also been provided for varying the frequency of the water feed according to the distance that it is desired to set the plants apart.

The present invention has for its object to apply to the transplanting machine the principle of a check row planter, thereby enabling the distance between the settings to be accurately gaged instead of being guessed at as has heretofore been the case.

A further object of the invention is to produce a construction whereby the checking heads will be supported in such a fashion that the check wire will be carried or moved toward the unplanted ground in advance of the machine as the latter progresses, thereby avoiding the possibility of the check wire sweeping over the ground to the detriment of the young plants just set out.

A further object of the invention is to produce simple and improved foldable supports for the checking heads whereby the latter, when the machine is in operation, will be spaced apart from the sides of the machine while, when the machine is to be transported or when it has to pass through gates or obstructed places, the frames carrying the checking heads may be raised to an upright position and held securely in such position temporarily.

A further object of the invention is to produce simple and improved means for transmitting motion from the checking heads over the ground wheels of the machine for the proper actuation of the working parts of the device.

A further object of the invention is to produce a slidably or movably supported gage device which will be intermittently actuated in a rearward direction while the machine is progressing forwardly to afford a relatively fixed point constituting a gage which will indicate the exact spot where each plant is to be set as the machine advances, thereby enabling the plants to be set unvaryingly at equal distances apart.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be restored when desired.

In the drawings:

Figure 1 is a diagrammatic top plan view of a machine constructed in accordance with the invention.

Fig. 2 is a longitudinal sectional view partly in elevation.

Fig. 3 is a rear elevation partly in section of portions of one side of the machine including one of the ground wheels and a portion of the axle and related parts.

Fig. 4 is a sectional view taken on the line 4—4 in Fig. 3.

Fig. 5 is a sectional detail view taken on the line 5—5 in Fig. 3.

Fig. 6 is a sectional detail view taken on the line 6—6 in Fig. 3.

Fig. 7 is a detail plan view showing the furrow opener, the water feed and the movable gage member.

Fig. 8 is a perspective detail view showing the gage member detached.

Fig. 9 is a detail view in side elevation showing the device for operating the water feed valve.

Fig. 10 is a plan view of one of the extension frames carrying the checking heads, and related parts.

Fig. 11 is a view in rear elevation of the parts seen in Fig. 10.

Fig. 12 is a sectional detail view taken on the line 12—12 in Fig. 11.

Fig. 13 is a detail view showing in elevation the hubs or collars 76 and 77 and related parts.

Fig. 14 is a detail view in side elevation, partly in section of the clutch device which is used in connection with the improved machine.

Corresponding parts in the several figures of the drawings are denoted by like characters of reference.

The frame of the machine includes an angle iron 15 in the angle of which the axle 16 is located, said axle being non-rotatable while the ground wheels 17 carried by said axle are free to rotate thereon, the axle being extended materially beyond the outer faces of said ground wheels. The angle bar 15 supports a pair of bracket members 18 each of which consists of a substantially rectangular frame, the same being slotted for the passage of a vertical bar 19 which may be mounted adjustably with respect to the bracket member 18 by means of a transverse pin 20. Secured adjacent to the side faces of the tongue 21 and connected securely with a circular disk 21' on the under face of the tongue, are angle bars 22 having downwardly extending divergent offsets 23 provided with rearward extensions 24 that are disposed substantially in a horizontal plane, said extensions 24 being bolted upon or otherwise connected with the bars 19 near the lower ends of said bars. The offset portions 23 support a cross bar 25 which is connected with the upper ends of the vertical bars 19 by angle bars 26; the bars 22 with their offset portions 23 and extensions 24 coöperating with the vertical bars 19, the angle bar 15 and the top bars 26 to constitute the frame structure of the machine. The circular disk 21' with which the angle bars 22 are connected constitutes a track for a turn table 27 having a downwardly extending fork 28 that carries a caster wheel or steering wheel 29. By this construction the necessary freedom of movement is provided when it shall be desired to vary the angle of the frame structure by adjustment vertically of the frame bars 19. The frame bars 24 are extended rearwardly and seats S for the operators are mounted on said frame bars it being evident that by proper vertical adjustment of the bars 19 the seats may be raised or lowered. The top bars 26 of the frame are provided with suitable supports 30 for a tank or barrel 31 containing water that is to be supplied to the plant settings.

Supported on the ends of the axle adjacent to the outer faces of the ground wheels 17 are substantially rectangular frames F, each of said frames including a longitudinally disposed outer side bar 32 and a longitudinally disposed inner side bar 33, the latter being disposed in a horizontal plane above that of the outer bar 32 by means of brackets 34 rising from the front and rear cross bars 35, 36 of the frame. Each of said frames is connected with the cross bar 25 by a brace member 37 which may be integral with the said cross bar 25, the detail construction being of little importance provided that the inner longitudinal bar of each frame is supported above the outer longitudinal bar of such frame. The outer bar or side member 32 of each frame F is provided with brackets 38 affording bearings for pivot members 39 on which the checking frames G are hingedly supported, each of said checking frames including substantially parallel side members 40 and an obliquely disposed brace member 41. The inner ends of the side members 40 and the brace member 41 are extended beneath the inner longitudinal side bar 33 of the frame F, the latter constituting a stop member whereby the downward movement of the outer extremity of the checking frame is limited. Bolted on the axle adjacent to each end thereof, and adjacent to the outer face of the ground wheel, is a bracket 42 having an upwardly extending arm 43, said arms 43 serving to support a cross bar 44 that extends transversely above the frame of the machine and above the ground wheels, said bar 44 being provided at each end thereof with a bearing member 45 supporting a spring actuated dog or latch member 46 adapted for engagement with a cross bar 47 of the checking frame G when the latter is moved to an upright position, as best seen in Fig. 3, it being evident that the checking frames may thus be safely supported in a vertical position to enable the machine to pass through gates and the like which would not be convenient and would be sometimes impossible when the checking frames are in extended position, as seen in Fig. 1.

The angle bar 15 supports adjacent to one of the ground wheels 17 a casting or bracket member C with which is connected an upwardly extending arm 47 the upper end of which is bent to produce a substantially rectangular frame B the side members 48 of which coöperate with the uprights 43 to afford bearings for the sections 49, 49' of a divided rock shaft, the meeting ends of said sections being positioned about midway between the side members 48 of the frame B. Each of the shaft sections 49, 49' is provided near the outer end thereof with a rearwardly extending arm or crank 50 which is connected with the cross bar 44 by a retracting spring 51. Each of the frames G carries at the outer end thereof a checking head H, which is substantially of the construction employed in check row corn planters, embodying a main frame 52, a hingedly supported sub-frame 53 and guide rollers 54, 55 carried by the respective frames for the purpose of guiding the check wire 56. The position of the checking head, however, is inverted so that the hingedly supported frame 53, or sub-frame as I have chosen to call it, will swing downwardly when the latch device 57, whereby it is usually maintained in position for operation, is released. The frame G supports a rock shaft 58 carrying the fork 59 the prongs of which obviously extend in a downward direction for engagement with the check wire. The rock shaft 58 has at the inner end thereof a crank 60 which is connected by a link 61 with a link 62 depending from the crank 50 of the shaft section 49 or 49′, as the case may be. It is obvious that by each actuation of the rock shaft 58 through the medium of the check wire, the rocking motion will be transmitted to the shaft section 49 or 49′, as the case may be.

Each of the shaft sections 49 and 49′ is provided near its inner end with a collar 63 which is securely fixed thereon, said collar having a lifting arm 64, as best seen in Fig. 5 of the drawings. A hub or collar 65 is mounted intermediate the collars 63, said hub having a radially extending arm or crank 66 beneath which the lifting arms 64 are extended. Stop members 67 may be located in the paths of the arms or cranks 50 for the purpose of limiting the rocking movement of the shaft sections 49, 49′ under the influence of the retracting spring 51. The mechanism including the divided rock shaft composed of the sections 49, 49′ is for the purpose of transmitting motion from the ground wheels of the transplanter to the devices whereby the gage member and the water supply are actuated and regulated and which will now be described.

Supported on the axle bar or frame bar 15 are bracket members 68 affording bearings for a shaft 75 carrying the dog 74 which is actuated by a spring 74′ whereby it is normally held in proper position with respect to a clutch device embodying a wheel or disk 70 having a flange 70′ provided with internal corrugations. Said wheel which is loosely mounted on a countershaft 69 supported by the brackets 68 has a sleeve 71, see Fig. 1, carrying a sprocket wheel 71′ connected by a chain 72 with a sprocket wheel 72′ on one of the ground wheels mounted on the axle 16. The clutch wheel 70 will in this manner be constantly rotated while the countershaft 69 remains stationary. Fixed on the countershaft is a clutch member embodying a cam 73′ carrying a spring actuated dog 75′, said dog carrying a roller 76′ which is adapted for engagement with the corrugated flange 70′ but which is normally held out of engagement with said flange by the action of the dog 74, the latter carrying a roller 77′ engaging a recess 78′ in the cam 73′ and pressing against the spring actuated dog 75′ with the effect of holding the roller 76′ out of engagement with the corrugated flange 70′. The dog 74 is connected by a link 76 with the crank 66 of one of the rock shaft sections 49 or 49′. When the rock shaft section is actuated by the check rowing device the roller 77′ will be moved out of the path of the cam 73′ and the spring actuated dog 75′, the roller 76′ being thus placed in engagement with the corrugated flange 70′, thereby establishing a fixed connection between the wheel or clutch member 70 and the countershaft 69 which latter will be rotated until, by engagement of the roller 77′ of the dog 74, which has been meanwhile restored to its normal position by the action of the spring 74′, the dog 75′ will be pressed against the tension of its actuating spring, thereby disengaging the roller 76′ from the corrugated flange 70′, and causing the rotation of the countershaft 69 to be interrupted. This clutch device is of well known construction, being known as the Dooley clutch and is herein described and shown for purposes of illustration only.

Fixed on the countershaft 69 is a hub or collar 76 and adjacent to said collar is a second hub or collar 77 which rotatably engages the countershaft and which is provided with an arcuate slot 78 which is concentric with the axis of the countershaft 69, and which receives a clamping bolt 79 connected with the hub or collar 76 for the purpose of clamping the members 76 and 77 securely together. The hubs or collars 76 and 77 have been shown each provided with a plurality of equidistantly disposed recesses or sockets 80, 81 for the reception of pins or tappet members 82, 83, said pins or tappet members being arranged to extend in opposite directions with respect to the hubs or collars. It will be observed that by rotation of the collar 77 about the axis of the shaft 69 the pins or tappet members carried by the said collar 77 may be advanced or retracted with respect to the tappet members carried by the collar 76 thereby variously timing the operation of the parts actuated by said pins or tappet members.

Supported loosely adjacent to opposite sides of the striking device formed by the members 76, 77, are cam members designated respectively by O and P, said cam members being adapted to be actuated respectively by the tappets 82 and 83. The cam member O includes a curved arm 84 having a face portion 85 lying in the path of and adapted to be engaged by the tappet pin or pins 82 which, when the countershaft 69 is rotated, will quickly actuate the cam member O against the tension of its retracting spring 86. The cam member O has an arm 87 which is connected with one end of a rod 88, said rod being connected through the medium of a crank 87' and a connecting link 88' with a slide 90' suitably guided in a rearward direction and provided at its rearward end with an arcuate portion constituting a cam 89 whereby the valve 90 of a water supply pipe 91 will be momentarily thrown open, the supply pipe or duct 91 being suitably connected with the tank or reservoir 31. The valve casing 92 is so arranged and positioned that when the valve is thrown open a jet of water will gush forth in the proper place to irrigate a plant setting which is being placed in the ground. As soon as the tappet pin 82 passes out of engagement with the face portion 85 of the cam O, the latter will be retracted, and the water supply shut off.

The cam member P has an arm 93, best seen in Fig. 6, said arm being provided with a striking face 94 whereby the cam is actuated by the impact of the tappet 83; said cam arm is also provided with an arcuate face 95 which will be engaged by the tappet 83, said arcuate cam face being of such contour that the cam member will be caused to return slowly after being engaged by the tappet member. The cam member P has an arm 96 connected with a retracting spring 97 and it has another arm 98 which is connected by means including a link 99, a crank 99' and a connecting rod 100' with an elongated U-shaped gage member Q best seen in Fig. 8, said gage member having a downturned portion producing a hand rest 100 and one limb of said U-shaped member being provided with a sleeve 101 adjustable thereon and carrying a pintle 102 with which the link member 99 is connected. It is obvious that by adjustment of the gage member Q with respect to the sleeve 101, the position of the hand rest 100 may be varied. The gage member Q is guided in suitable supports and it will be seen that by the action of the cam member P when actuated by the tappet 83, the said cam member will be moved in a rearward direction while the machine is advancing in a forward direction, the movement of the gage member being so speeded that it will remain substantially stationary with respect to the surface of the ground for a brief period while the machine is advancing. The gage member will then, owing to the peculiar contour of the face of the cam member, whereby it is actuated, slowly return to neutral position with respect to the machine while the tappet 83 engages the portion 95 of the cam member P. When the tappet member passes out of engagement with the arcuate portion 95, the cam member P will be retracted by the spring 97 to its initial position where it will be ready for a repetition of the operation. The cam members O and P are so arranged that the cam P will be actuated at a short interval after the actuation of the cam member O, the duration of the interval being determined by the adjustment of the sleeve or collar 77 carrying the tappets 83 with respect to the sleeve or collar 76 carrying the tappets 82. The gage member Q, as has been stated, is lengthwise adjustable, the purpose being to enable the hand rest to be properly placed with respect to the valve of the water supply.

The gage member Q, as well as the casing 92 of the water valve, will be supported on a shoe or furrow opener 103, the same being connected by a bifurcated draw bar 104 with the frame structure of the machine. The furrow opener and related parts will obviously be so positioned that the hand rest of the gage member may be conveniently reached by the operators occupying the seats S. Suitable covering devices are also provided, the same being illustrated as consisting of presser wheels 105, and it is to be understood that covering devices of any suitable character may be used.

The operation of this invention will be readily understood from the foregoing description, taken in connection with the drawings hereto annexed. As the machine advances over the field, the check row mechanism will be actuated, said check row mechanism serving to actuate the water feed as well as the gage bar at predetermined intervals, which may be varied by simply varying the distance between the buttons or fork actuating devices on the check wire. On the other hand, it may sometimes be desired to dismantle the checking device from the planter, and when this is done, the dog 74 should be disengaged from the clutch device normally engaged thereby so as to permit free rotation of the shaft carrying said clutch member; sprockets of different relative diameters may then be utilized for transmitting motion from the ground wheels 17 to the countershaft 69, and the number of tappets 82, 83 on the members 76 and 77 may be varied. Thus, the machine may be used for setting out plants at intervals varying from a few inches to several feet apart. The parts are so proportioned and arranged that when an operator holding a plant setting places his hand on the hand rest 100 of the gage member while the latter is stationary, the water feed will presently be actuated, irrigating a portion of the furrow that has been opened. As soon as the covering members press the dirt against the roots of the plant, the latter is released, and the gage member will presently be retracted for a repetition of the operation. By supporting the check wires at a relatively great distance from the side of the machine, the danger of the check wire sweeping over the newly set-out plants is avoided, and the reversal of the position of the checking heads permits the wire to be readily released when the machine is to be turned at the end of the field.

Having thus described the invention, what is claimed as new is:

1. In a transplanting machine, a wheel supported frame structure having an axle extending beyond the ground wheels, frames supported swingingly adjacent to the outer faces of the ground wheels, means for supporting said frames mounted on the extended ends of the axle, and checking heads carried by said frames.

2. In a transplanting machine, a wheel supported frame structure, substantially rectangular stationary frames supported adjacent to the outer faces of the ground wheels, frames swingingly connected with said stationary frames, and checking heads supported by the swingingly supported frames.

3. In a transplanting machine, a wheel supported frame structure having an axle extended beyond the ground wheels, stationary frames supported on the extended ends of the axle adjacent to the outer faces of the ground wheels, swingingly supported frames carried by these stationary frames, checking heads carried by the swingingly supported frames, and means for limiting the downwardly swinging movement of the free ends of the swingingly supported frames.

4. In a transplanting machine, a carrying frame, a stationary axle member, ground wheels rotatable on said axle member, said axle member having portions extending beyond the outer faces of the ground wheels, stationary frames supported on said outwardly extending portions, swinging frames carried by the stationary frames, checking heads carried by the swinging frames, and means for limiting the movement in a downward direction of the free ends of said swinging frames.

5. In a transplanting machine, a wheel supported carrying frame having an axle member extending beyond the outer face of the ground wheels, stationary substantially rectangular frames supported on the axle adjacent to the outer faces of the ground wheels, a connection between the forward ends of the stationary frames and the carrying frame, bracket members on the outer side bars of the stationary frames, frames supported swingingly on said bracket members and having members that extend beneath the inner side bars of the stationary frames to limit the downward movement of said swinging frames, and checking heads carried by the swinging frames.

6. In a transplanting machine, a wheel supported carrying frame, extension frames adjacent to the outer faces of the ground wheels, checking heads carried by said extension frames, swingingly supported forks associated with the checking heads, a countershaft supported on the frame structure, and means for transmitting rocking motion over the ground wheels of the machine from the forks associated with the checking heads to the countershaft.

7. In a transplanting machine, a wheel supported carrying frame, a furrow opener connected therewith, a water supplying device, and a movably supported gage bar on the furrow opener operating independently of the water supply.

8. In a transplanting machine, a wheel supported carrying frame, a furrow opener connected therewith, a device for supplying water to the furrow, a gage member movably supported with respect to the furrow opener, and means for intermittently actuating said gage member independently of the water supplying device.

9. In a transplanting machine, a wheel supported carrying frame, a furrow opener connected therewith, a gage member movably supported with respect to the furrow opener, and means for intermittently actuating said gage member, said means including check rowing mechanism and suitable transmission means.

10. In a transplanting machine, a wheel supported carrying frame, a furrow opener connected therewith, a gage member supported for longitudinal sliding movement with respect to the furrow opener, and checking mechanism and transmission means for intermittently actuating said gage member, said transmission means including mechanism whereby the gage member will be quickly projected and slowly retracted.

11. In a transplanting machine, a wheel supported carrying frame, a furrow opener connected therewith, means for supplying water at predetermined intervals to the furrow, a gage member slidingly supported with respect to the furrow opener, and means for actuating the gage member at predetermined intervals succeeding the actuation of the water supply.

In testimony whereof I affix my signature.

JASPER LEE THOMPSON.

Copies of this patent may be obtained for five cents each, by addressing the "Commissioner of Patents, Washington, D. C."